United States Patent
Okuda et al.

(10) Patent No.: US 8,544,210 B2
(45) Date of Patent: Oct. 1, 2013

(54) MOUNTING STRUCTURE FOR FRAME GARNISH

(75) Inventors: Hiromichi Okuda, Yokosuka (JP); Masaru Toyota, Toyota (JP); Hiroaki Yamasaki, Toyota (JP); Koji Yoshida, Anjo (JP); Masanori Kawano, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 196 days.

(21) Appl. No.: 12/733,588

(22) PCT Filed: Mar. 11, 2009

(86) PCT No.: PCT/JP2009/054662
§ 371 (c)(1),
(2), (4) Date: Jun. 8, 2010

(87) PCT Pub. No.: WO2009/119318
PCT Pub. Date: Oct. 1, 2009

(65) Prior Publication Data
US 2011/0010995 A1    Jan. 20, 2011

(30) Foreign Application Priority Data
Mar. 26, 2008 (JP) .................. 2008-081638

(51) Int. Cl.
*B60R 13/04* (2006.01)
*B60J 5/04* (2006.01)
(52) U.S. Cl.
USPC .......................................... 49/502; 296/1.08

(58) Field of Classification Search
USPC .......... 49/502; 292/1.08, 152, 146.2, 193.06, 292/31; 296/1.08, 152, 146.2, 193.06, 31
See application file for complete search history.

(56) References Cited

U.S. PATENT DOCUMENTS
4,506,419 A   3/1985  Mitomi
4,511,129 A * 4/1985  Kishino ................. 296/146.16
(Continued)

FOREIGN PATENT DOCUMENTS
JP    61-50024    4/1986
JP    2-26927     2/1990
(Continued)

OTHER PUBLICATIONS
Translation of International Preliminary Report on Patentability.
(Continued)

*Primary Examiner* — Katherine Mitchell
*Assistant Examiner* — Justin Rephann
(74) *Attorney, Agent, or Firm* — Finnegan, Henderson, Farabow, Garrett & Dunner, LLP (57) ABSTRACT

A mounting structure for mounting a frame garnish on a door window frame of a vehicle is disclosed. The door window frame includes a vertical portion extending in a generally vertical direction so as to overlap a center pillar of the vehicle. The door window frame is formed to surround a door window glass of the vehicle. The vertical portion includes a hooking hole formed in an upper part of the vertical portion and an insertion hole formed in a lower part of the vertical portion. The frame garnish includes a main portion, a hooking portion, and an insertion portion. The insertion portion is inserted into the insertion hole in the vertically downward direction, and the hooking portion is inserted into and hooked to the hooking hole.

12 Claims, 7 Drawing Sheets

(56) References Cited

U.S. PATENT DOCUMENTS

| | | | |
|---|---|---|---|
| 4,927,306 A | 5/1990 | Sato | |
| 5,533,237 A | 7/1996 | Higgins | |
| 5,651,634 A | 7/1997 | Kraus | |
| 5,702,148 A * | 12/1997 | Vaughan et al. | 296/146.9 |
| 5,968,614 A * | 10/1999 | Reichenberger et al. | 428/31 |
| 6,141,837 A | 11/2000 | Wisniewski | |
| 6,381,811 B2 | 5/2002 | Smith et al. | |
| 6,485,049 B1 * | 11/2002 | Prottengeier et al. | 280/730.2 |
| 6,772,484 B2 | 8/2004 | Miyano et al. | |
| 6,811,194 B1 | 11/2004 | Gaertner et al. | |
| 6,889,472 B2 | 5/2005 | Nozaki et al. | |
| 7,210,730 B2 * | 5/2007 | Fujita et | 296/146.5 |
| 7,231,696 B2 | 6/2007 | Asano et al. | |
| 7,264,306 B2 * | 9/2007 | Nakao et al. | 296/199 |
| 7,410,206 B2 * | 8/2008 | Koarai | 296/187.01 |
| 7,461,436 B2 | 12/2008 | Asano | |
| 2002/0043041 A1 | 4/2002 | Yoyasu | |
| 2005/0034282 A1 | 2/2005 | Kurily et al. | |
| 2005/0086773 A1 | 4/2005 | Kuhnle et al. | |
| 2005/0229514 A1 | 10/2005 | Nakao et al. | |
| 2006/0000064 A1 | 1/2006 | Leverger et al. | |
| 2006/0230587 A1 | 10/2006 | Okada | |
| 2007/0261313 A1 | 11/2007 | Ruppert et al. | |
| 2008/0116713 A1 * | 5/2008 | Jun et al. | 296/146.2 |
| 2008/0201920 A1 | 8/2008 | Jatzke | |
| 2008/0282617 A1 | 11/2008 | Zimmer et al. | |
| 2008/0298890 A1 | 12/2008 | Koike | |
| 2009/0199371 A1 | 8/2009 | Katoh et al. | |
| 2010/0115851 A1 * | 5/2010 | Nakao et al. | 49/502 |
| 2010/0293761 A1 | 11/2010 | Koike et al. | |
| 2011/0296764 A1 * | 12/2011 | Sawatani et al. | 49/502 |
| 2012/0023715 A1 | 2/2012 | Nakajima | |

FOREIGN PATENT DOCUMENTS

| | | |
|---|---|---|
| JP | 3-28052 | 3/1991 |
| JP | 3-100514 | 10/1991 |
| JP | 3-107326 | 11/1991 |
| JP | 7-34209 | 6/1995 |
| JP | 11-291762 | 10/1999 |
| JP | 2004-338522 | 2/2004 |
| JP | 2009-023630 | 2/2009 |
| WO | WO 2008/133115 | 6/2008 |

OTHER PUBLICATIONS

Office Action for UK Application No. GB1004175.4 dated Jan. 17, 2012.
Japanese Office Action for Appl. No. 2008-081638 dated Jan. 31, 2012.
Office Action dated Dec. 27, 2012 from U.S. Appl. No. 13/138,438.
International Search Report for PCT/JP2010/052601, dated Jun. 1, 2010.
International Search Report for PCT/JP2008/057353, dated Jul. 22, 2008.
Translation of International Preliminary Report on Patentability for PCT/JP2009/054662 issued Nov. 9, 2010.
International Search Report for PCT/JP2009/054662, dated Jun. 16, 2009.

* cited by examiner

MOUNTING STRUCTURE FOR FRAME GARNISH

FIELD OF THE INVENTION

The present invention relates to a mounting structure for a frame garnish that is mounted on a door window frame of an automobile.

BACKGROUND OF THE INVENTION

Figure 9:
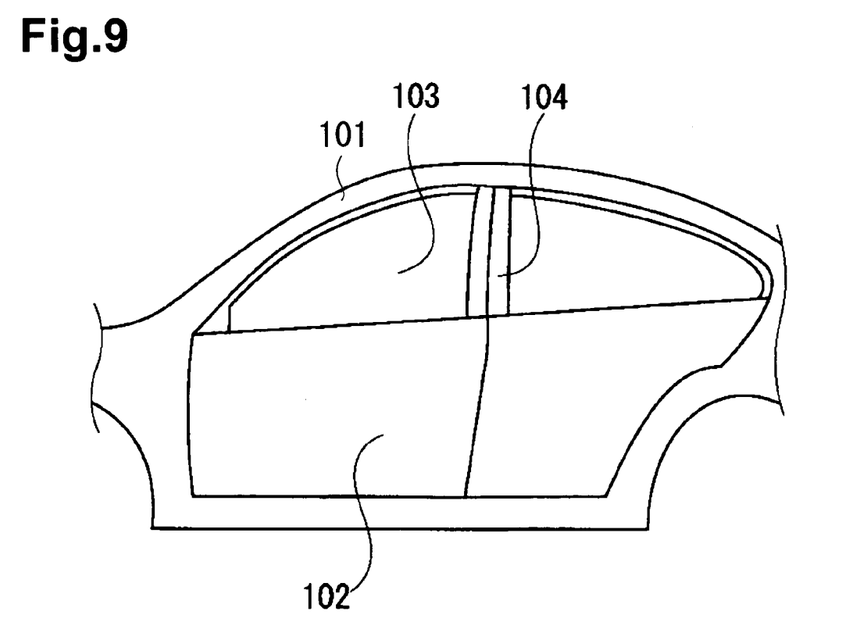
FIG. 9 is a left view showing a typical vehicle.
Figure 10:
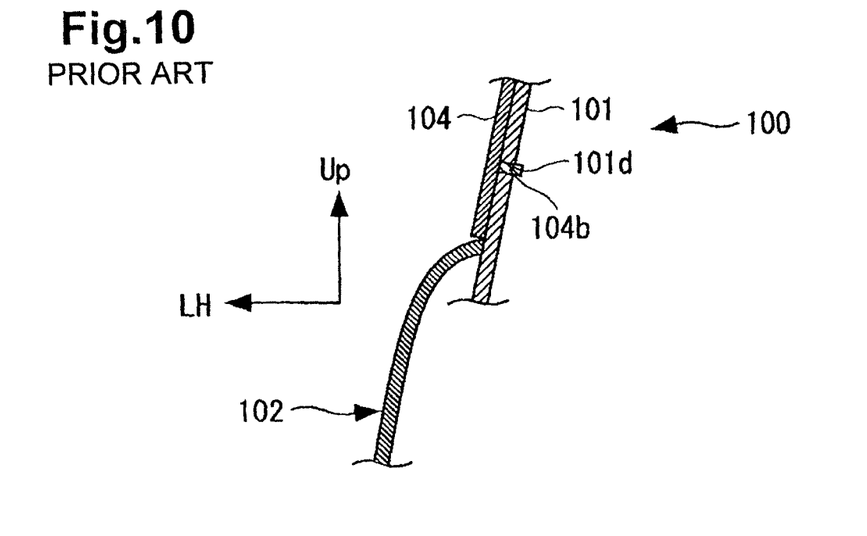
FIG. 10 is a view showing a mounting structure for a frame garnish in the prior art.

Referring to FIG. 9, a door window frame 101 is shaped to surround a door window glass 103, which is arranged in the upper half portion of each side door 102 of an automobile. Patent document 1 discloses the mounting of a frame garnish 104 on each door window frame 101 near the boundary between the door window glass 103 located at the front side of the vehicle and the door window glass 103 located at the rear side of the vehicle. As shown in FIGS. 9 and 10, the frame garnish 104 is generally plate-shaped and extends in a generally vertical direction.

Figure 11:
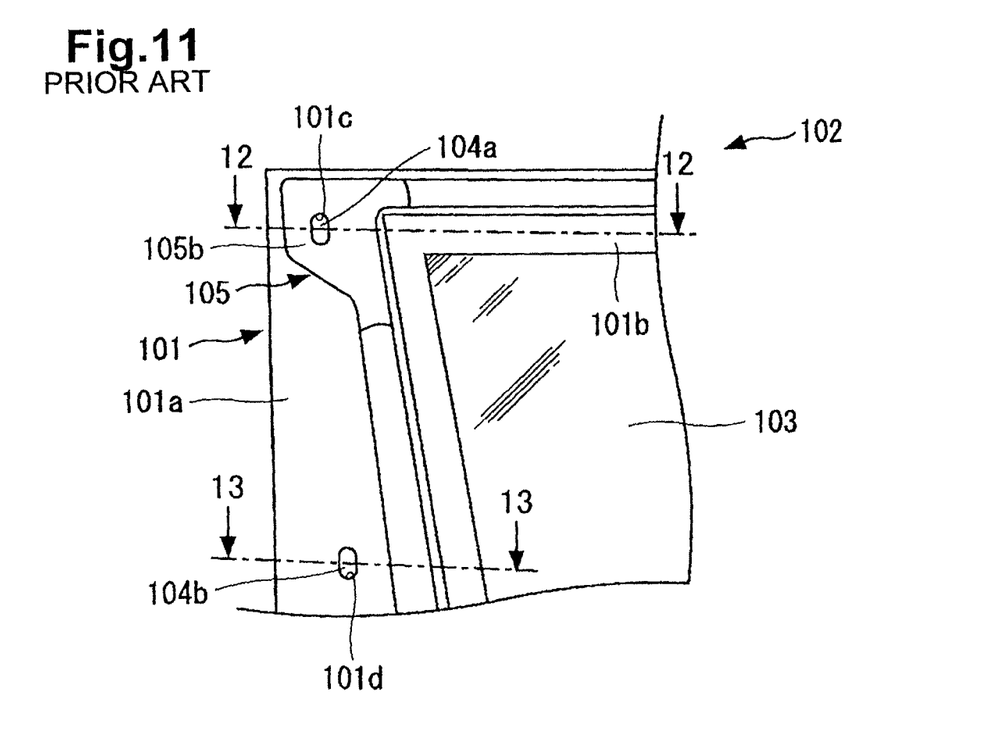
FIG. 11 is a view showing the mounting structure for the frame garnish in the prior art.

As shown in FIGS. 9 and 11, the door window frame 101 includes a diagonal portion, which is located at the front side of the vehicle, an upper portion 101b, which extends along the upper rim of the door window glass 103, and a vertical portion 101a, which is located at the rear side of the vehicle and extends in a generally vertical direction so as to cover the center pillar of the vehicle. A hooking hole 101c extends through an upper part of the vertical portion 101a, and a reception hole 101d extends through a lower part of the vertical portion 101a. The frame garnish 104 is mounted on the vertical portion 101a.

Figure 12:
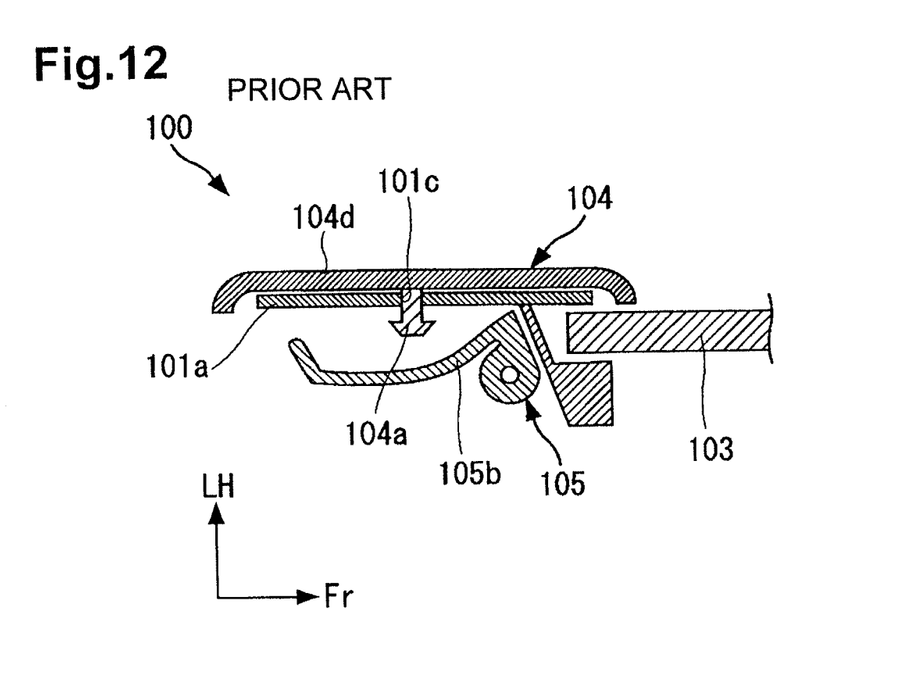
FIG. 12 is a cross-sectional view taken along line 12-12 in FIG. 11.

In detail, as shown in FIG. 12, a hooking portion 104a projects orthogonally from the upper inner surface of the frame garnish 104. The hooking portion 104a is insertable into the hooking hole 101c, which is formed in the vertical portion 101a of the door window frame 101, and hooks the frame garnish 104 to the vertical portion 101a.

Figure 13:
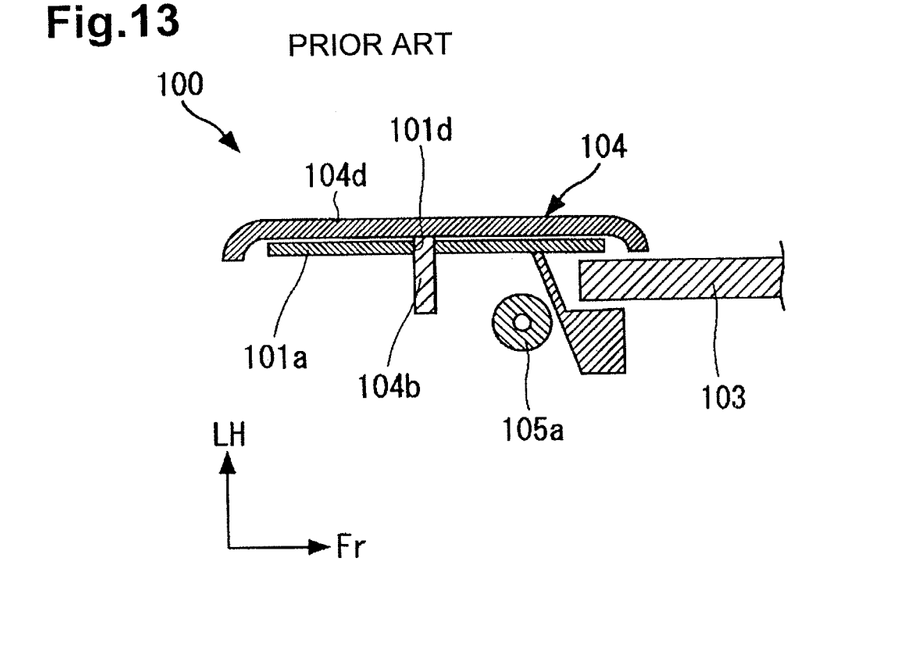
FIG. 13 is a cross-sectional view taken along line 13-13 in FIG. 11.

As shown in FIG. 13, a boss 104b projects orthogonally from the lower inner surface of the frame garnish 104. The boss 104b is insertable into the reception hole 101d, which is formed in the vertical portion 101a of the door window frame 101. The frame garnish 104 is mounted on the door window frame 101 by inserting the boss 104b into the reception hole 101d of the vertical portion 101a and hooking the hooking portion 104a to the hooking hole 101c of the vertical portion 101a. The frame garnish 104 decorates the exterior of the door window frame 101.

Referring to FIGS. 12 and 13, a door weather strip 105, which is used for sealing purposes and formed from a rubber material, is attached along the door window frame 101 on a surface of the door window frame 101 facing toward the passenger compartment side. The door weather strip 105 includes a vertical portion 105a, which corresponds to the vertical portion 101a of the door window frame 101. The vertical portion 105a has a width that is greater at an upper part 105b of the vertical portion 105a than a lower part. The width at the main part of the vertical portion 105a is about half the width of the upper part 105b. Thus, the upper surface of the door window frame 101 facing toward the passenger compartment is covered by the wide section (upper part 105b) of the door weather strip 105, and the hooking hole 101c and the hooking portion 104a, which is hooked to the hooking hole 101c, are not exposed toward the passenger compartment. However, the reception hole 101d and the boss 104b, which is inserted into the reception hole 101d, are neither covered nor hidden by the door weather strip 105 and are exposed toward the passenger compartment.

As described above, in the conventional mounting structure 100 for the frame garnish 104, the surface of the door window frame 101 facing toward the passenger compartment is only partially covered by the door weather strip 105. This lowers the aesthetic appeal of the surface of the door window frame 101 facing toward the passenger compartment. To solve this problem, the width may be increased throughout the vertical portion 105a of the door weather strip 105 from the upper part 105a to the lower part in order to cover and hide the reception hole 101d and the boss 104b, which is inserted into the reception hole 101d. However, the production of a mold for molding the door weather strip 105 with a wide vertical portion would increase the manufacturing costs of the door weather strip 105. Additionally, more material would be necessary to mold the door weather strip 105 and further raise costs.

Patent Document 1: Japanese Laid-Open Utility Model Publication No. 02-026927

SUMMARY OF THE INVENTION

It is an object of the present invention to provide a mounting structure for a frame garnish that allows for easy mounting and obtains an aesthetic appeal without having to modify the weather strip.

To achieve the above object, one aspect of the present invention provides a mounting structure for mounting a frame garnish on a door window frame of a vehicle. The door window frame includes a vertical portion extending in a generally vertical direction so as to overlap a center pillar of the vehicle. The door window frame is formed to surround a door window glass of the vehicle. The vertical portion includes a hooking hole formed in an upper part of the vertical portion and an insertion hole formed in a lower part of the vertical portion. The frame garnish includes a main portion, a hooking portion, and an insertion portion. The main portion is generally plate-shaped and extends along the vertical direction. The hooking portion projects from an inner surface of the main portion orthogonally to the inner surface. The insertion portion projects vertically downward from a bottom part of the inner surface of the main portion.

Preferably, opposite sides of the insertion hole are cut out from the bottom part of the vertical portion for a predetermined length along a longitudinal direction of the vertical portion to form a tab that includes the insertion hole. The tab is bent to have a crank-shaped cross-section.

With such a structure, the frame garnish may be attached to the vertical portion by inserting the insertion portion into the insertion hole and inserting the hooking portion into the hooking hole. This allows for the mounting of a frame garnish that is easy to mount and has satisfactory aesthetic appeal without the need for modifying the weather strip, without increasing the vehicle weight, and without raising costs. Further, when mounting the frame garnish, sideward movement of the frame garnish is prevented. This decreases differences in the fastening position, improves the aesthetic appeal, and increases the working efficiency.

DETAILED DESCRIPTION OF THE PREFERRED EMBODIMENTS

A mounting structure 1 for a frame garnish 5 according to one embodiment of the present invention will now be discussed with reference to FIGS. 1 to 8. The frame garnish 5 is used as an exterior cover for a door window frame 3 of each side door mounted on left and right sides of the vehicle. Further, the frame garnish 5 is mounted on an outer surface of a vertical portion 3a of the door window frame 3. In the description of this specification, the terms "upward", "forward", and "leftward" respectively correspond to the characters "Up", "Fr", and "LF" shown in the drawings.

Figure 1:
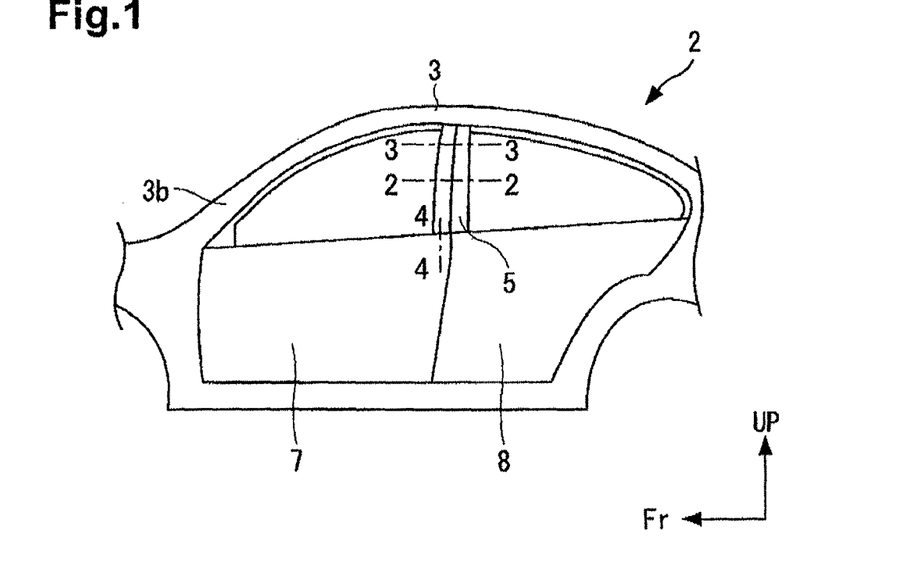
FIG. 1 is a left view showing a vehicle including a frame garnish according to a first embodiment of the present invention.
Figure 2:
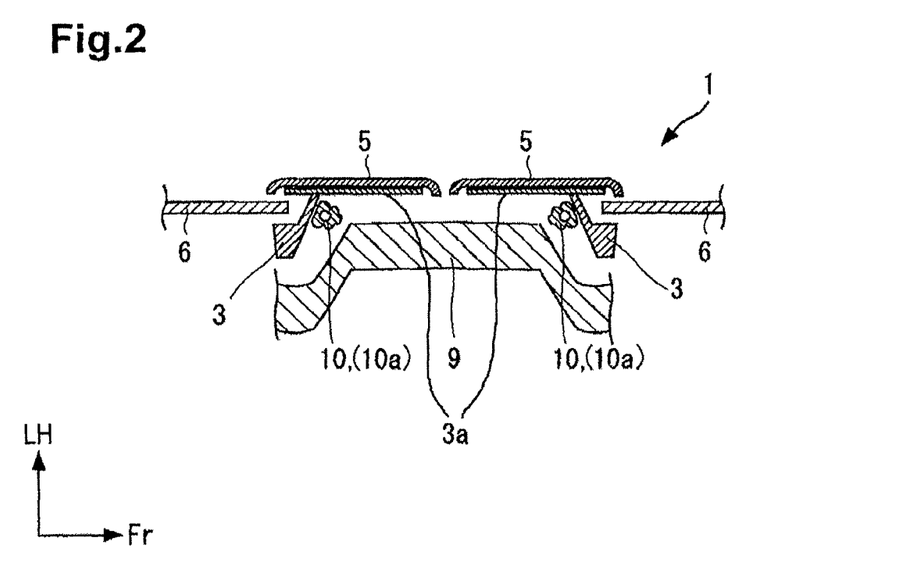
FIG. 2 is a cross-sectional view taken along line 2-2 in FIG. 1.

Referring to FIG. 1, in this embodiment, a vehicle 2 includes a front left side door 7, which is mounted on the front left side of the passenger compartment, a front right side door (not shown), which is mounted at a location opposite the front left side door 7 in the vehicle widthwise direction, a rear left side door 8, which is mounted at the rear of the front left side door 7, and a rear right side door (not shown), which is mounted at a location opposite the rear left side door 8 in the vehicle widthwise direction. As shown in FIG. 2, a center pillar 9 extends in the generally vertical direction at the boundary between the front left side door 7 and rear left side door 8 and at the boundary between the front right side door and the rear right side door, that is, at a central part of the left and right sides of the vehicle 2 in the longitudinal direction.

The door window frames 3 for the front left side door 7, the front right side door, the rear left side door 8, and the rear right side door each have a vertical portion 3a, which extends in the generally vertical direction to overlap the corresponding center pillar 9. The frame garnish 5 is mounted on each vertical portion 3a.

The mounting structure 1 for the frame garnish 5 of the door window frame 3 for the front left side door 7 in the present embodiment will now be discussed.

Figure 4:
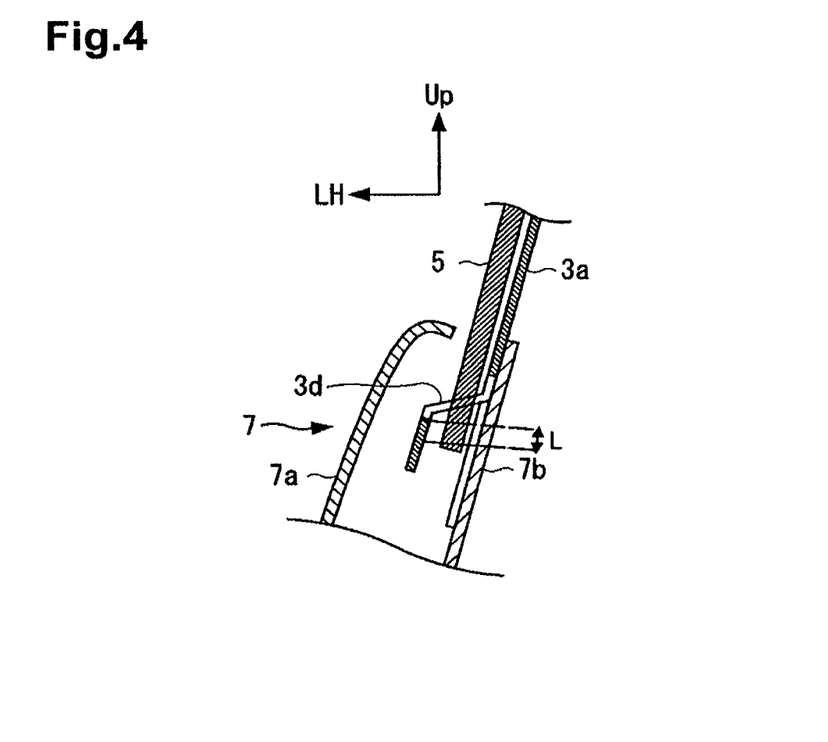
FIG. 4 is a cross-sectional view taken along line 4-4 in FIG. 1.

The front left side door 7 has a front portion, which is hinge-coupled to the vehicle 2 so that it can freely open and close the front left side of the passenger compartment. As shown in FIG. 4, the front left side door 7 includes an outer panel 7a, which faces away from the passenger compartment, and an inner panel 7b, which faces toward the passenger compartment. A window glass 6, which is vertically movable, is arranged at an upper part of the front left side door 7. When the door window glass 6 is moved downward, the door window glass 6 is retained in the door 7.

The door window frame 3 is arranged at the upper part of the front left side door 7 so as to surround the door window glass 6. As shown in FIGS. 1 and 2, the door window frame 3 includes the vertical portion 3a, which extends in the generally vertical direction to overlap part of the center pillar 9, and a diagonal portion 3b, which extends along a gradually descending curve from the top end of the vertical portion 3a toward the front end of the front left side door 7.

Figure 3:
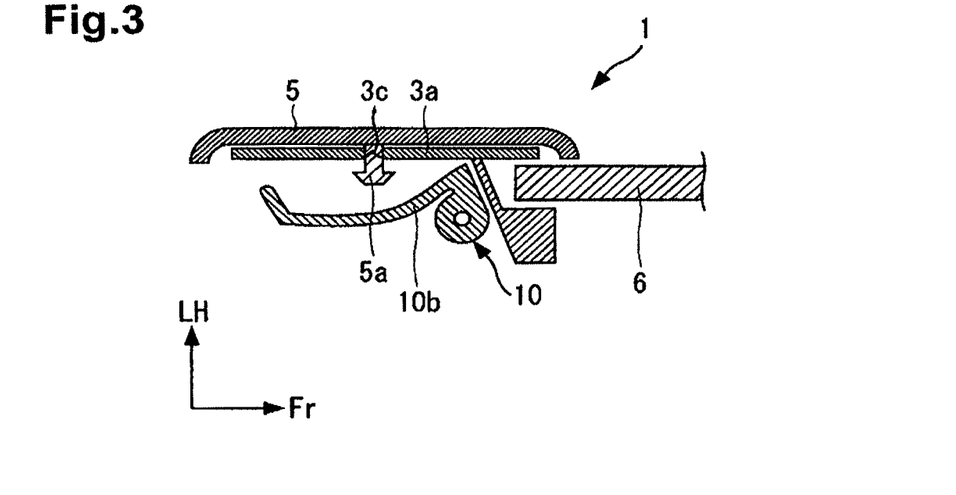
FIG. 3 is a cross-sectional view taken along line 3-3 in FIG. 1.

As shown in FIG. 3, a hooking hole 3c extends through the vertical portion 3a near the top end of the vertical portion 3a. As shown in FIG. 4, the vertical portion 3a has a lower part fixed to the inner panel 7b of the front left side door 7. An insertion hole 3d is formed in the lower part of the vertical portion 3a. An insertion portion 5b (FIG. 7), which is formed in a bottom part of the frame garnish 5, is inserted into the insertion hole 3d.

Figure 5:
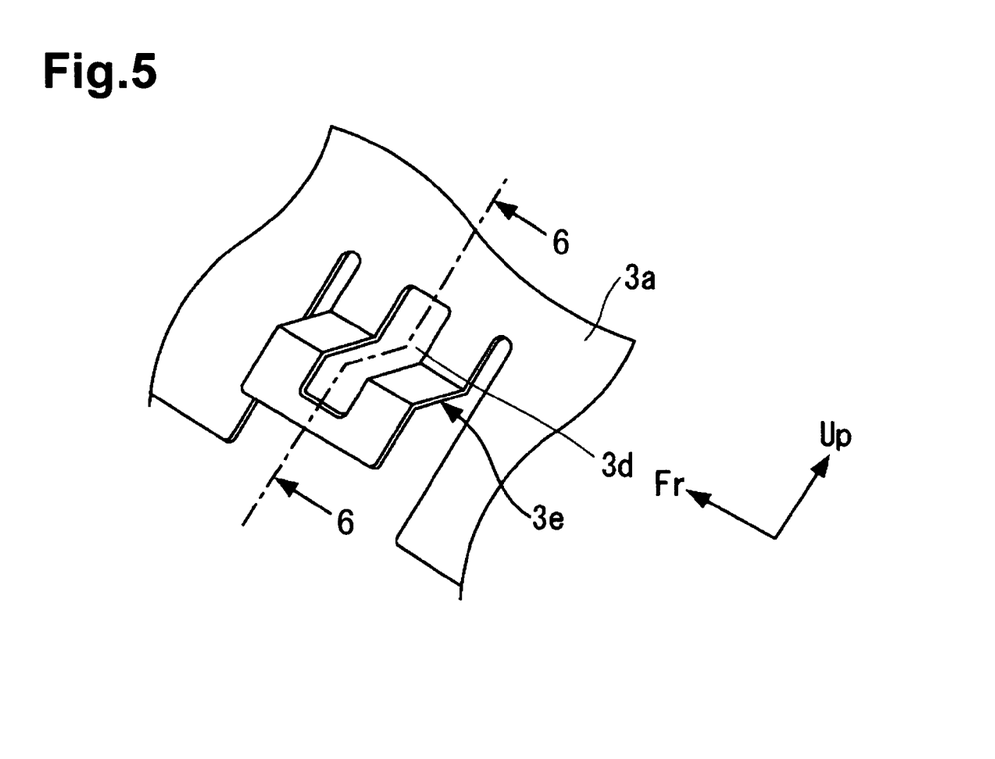
FIG. 5 is a perspective view showing a section near a lower part of the frame garnish.
Figure 6:
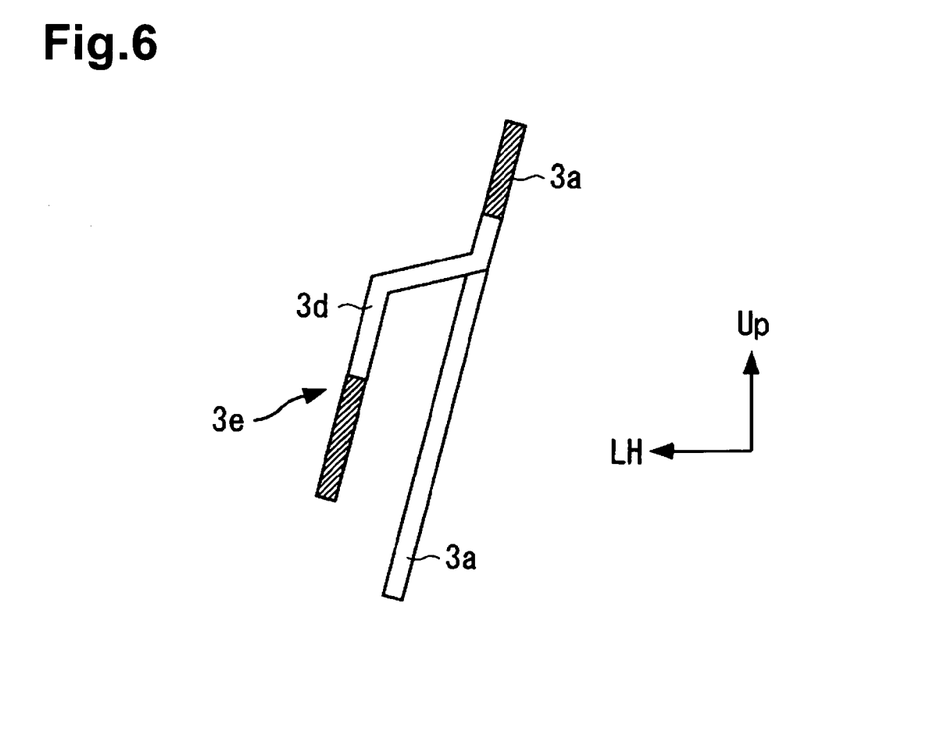
FIG. 6 is a cross-sectional view taken along line 6-6 in FIG. 5.

As shown in FIGS. 5 and 6, opposite sides of the insertion hole 3d are cut out from the lower part of the vertical portion 3a for a predetermined length from the bottom end of the vertical portion 3a. This forms a tab 3e, which includes the insertion hole 3d. In detail, the tab 3e is valley-folded with respect to the vertical portion 3a and mountain-folded so that a section near the bottom end of the tab 3e is parallel to the vertical portion 3a. In other words, the tab 3e has a crank-shaped cross-section. Thus, when the insertion portion 5b of the frame garnish 5 (refer to FIG. 7) is inserted into the insertion hole 3d, the insertion portion 5b is fixed to the door window frame 3 while maintaining an overlapping range L with the door window frame 3 (refer to FIG. 4). Further, the insertion portion 5b is not displaced in the insertion hole 3d in the widthwise direction of the vertical portion 3a. Accordingly, the frame garnish 5 is fixed to the door window frame 3 without becoming loose.

Figure 7:
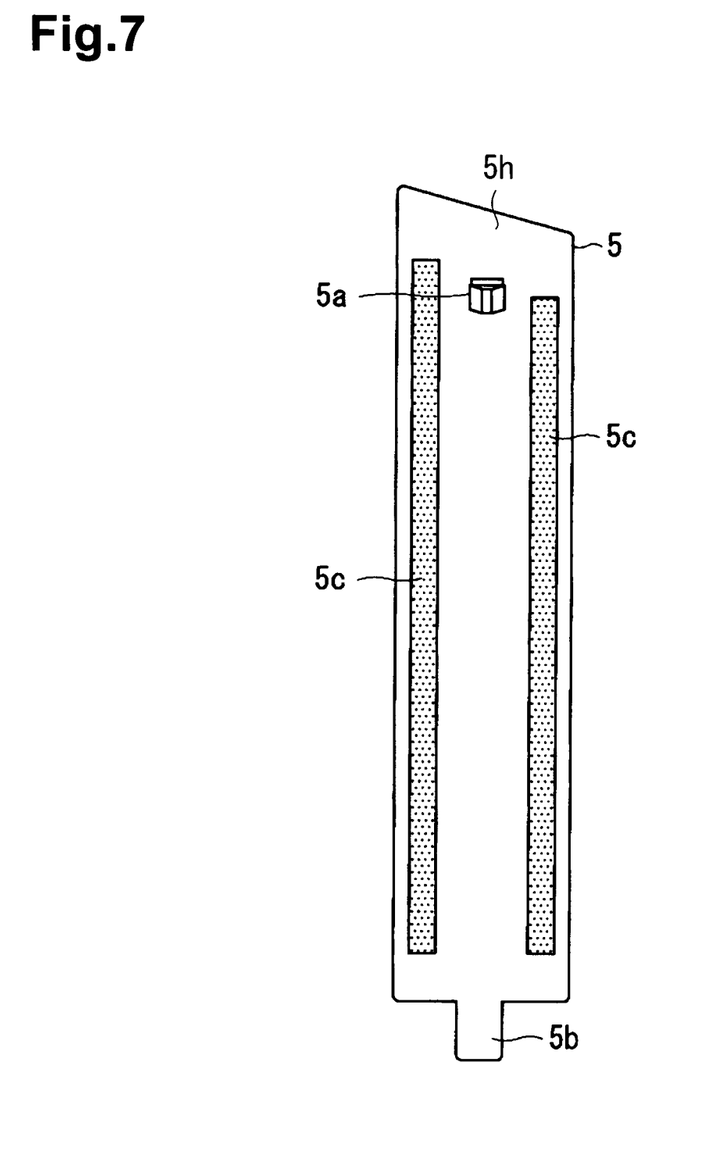
FIG. 7 is a view showing an inner surface of the frame garnish in FIG. 5.

As shown in FIG. 7, the frame garnish 5 includes a generally plate-shaped main portion 5h, which has a width that is slightly greater than that of the vertical portion 3a. The two edges of the main portion 5h in the widthwise direction are inwardly rounded (FIG. 4). This allows for the main portion 5h to cover the two edges in the widthwise direction and the outer surface of the vertical portion 3a. The main portion 5h has an inner surface with a hooking portion 5a projecting orthogonally from an upper part of the inner surface. The insertion portion 5b, which is insertable into the insertion hole 3d, is formed in the bottom part of the frame garnish 5 projecting vertically downward.

When mounting the frame garnish 5 on the door window frame 3, referring to FIG. 7, double-sided strips 5c and 5c are adhered to the two widthwise direction edges in the inner side of the frame garnish 5 so as to extend continuously from almost the top end to almost the bottom end. Next, the insertion portion 5b of the frame garnish 5 is inserted into the insertion hole 3d of the door window frame 3. Then, the hooking portion 5a of the frame garnish 5 is inserted into and hooked to the hooking hole 3c of the door window frame 3. Finally, the double-sided strips 5c and 5c are adhered to an outer surface of the door window frame 3 thereby completing the mounting of the frame garnish 5 onto the vertical portion 3a of the door window frame 3.

As described above, the tab 3e has a crank-shaped cross-section. Thus, the insertion portion 5b is fixed to the door window frame 3 while maintaining an overlapping range L with the door window frame 3. Accordingly, the insertion portion 5b does not move relative to the vertical portion 3a in the widthwise direction, and the frame garnish 5 is stably fixed to the door window frame 3.

As shown in FIG. 2, a door weather strip 10, which is used for sealing purposes and formed from a rubber material, is attached along the door window frame 3 on the surface of the door window frame 3 facing toward the passenger compartment. The door weather strip 10 includes a vertical portion 10a, which corresponds to the vertical portion 3a of the door window frame 3. The vertical portion 10a has a width that is greater at an upper part 10b of the vertical portion 10a than a lower part of the vertical portion 10a. The width at the main part of the vertical portion 10a is about half the width of the upper part 10b.

Figure 8:
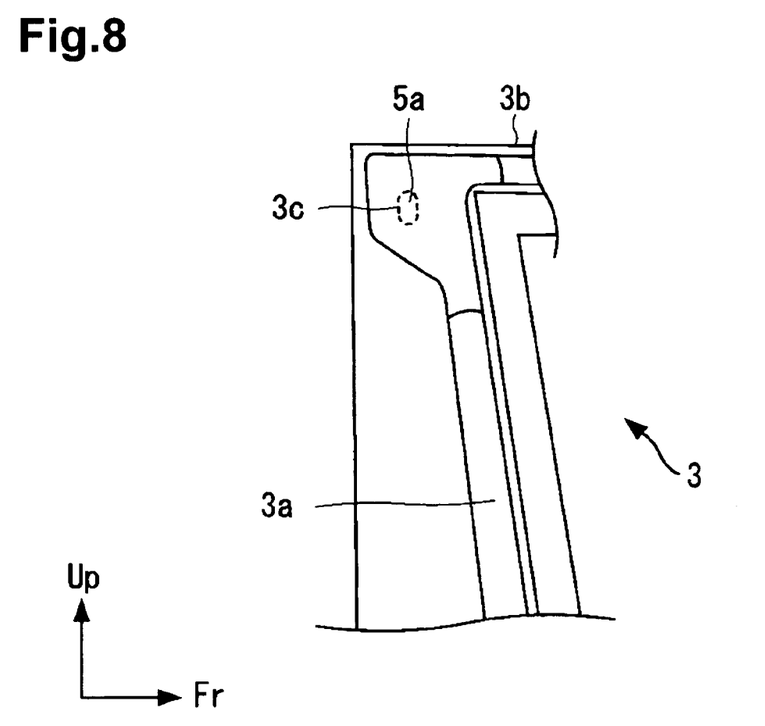
FIG. 8 is a view showing a mounting structure for the frame garnish in FIG. 5.

As shown in FIG. 8, the upper surface of the door window frame 3 facing toward the passenger compartment is covered by the upper part 10b of the door weather strip 10 (not shown in FIG. 8). Thus, the hooking hole 3c and the hooking portion 5a, which is hooked to the hooking hole 3c, are covered and hidden. The width at the lower part of the vertical portion 10a in the door weather strip 10 is smaller that the width of the upper part 10b. However, the insertion portion 5b, which is formed in the lower part of the frame garnish 5, is inserted into the insertion hole 3d of the door window frame 3 in the front left side door 7. Thus, the section near the insertion portion 5b is not exposed to the exterior. As a result, the section near the portion of the frame garnish 5 mounted on the door window frame 3 is not exposed to the exterior. This increases the aesthetic appeal.

As discussed above, the insertion portion 5b, which projects downward, is arranged at the bottom end of the frame garnish 5, and an insertion hole 3d, into which the insertion portion 5b is insertable in a vertically downward direction, is arranged in the lower part of the door window frame 3. Accordingly, the frame garnish 5 may easily be mounted on the door window frame 3 by inserting the insertion portion 5b into the insertion hole 3d. The mounting structure for a frame garnish according to the present invention may be embodied in various forms without departing from the spirit and scope of the invention.

The invention claimed is:

1. A mounting structure for mounting a frame garnish on a door window frame of a vehicle, wherein:
    the door window frame includes a vertical portion extending in a generally vertical direction so as to overlap a center pillar of the vehicle, the door window frame being formed to surround a door window glass of the vehicle;
    the vertical portion including a hooking hole formed in an upper part of the vertical portion and an insertion hole formed in a lower part of the vertical portion;
    the frame garnish includes a main portion, which extends along the vertical direction, a hooking portion, which projects from an inner surface of the main portion in a direction oriented orthogonally with respect to the inner surface, and an insertion portion, which projects vertically downward from a bottom part of the inner surface of the main portion;
    the frame garnish and the vertical portion are configured such that the frame garnish is attachable to the vertical portion by inserting the insertion portion into the insertion hole in the vertically downward direction and inserting and hooking the hooking portion in the hooking hole; and
    the vertical portion includes an integrally formed tab defined by leg portions extending along a longitudinal direction from the lower part of the vertical portion, wherein the insertion hole passes through the tab and opposite sides of the insertion hole are defined by the leg portions.

2. The mounting structure according to claim 1, wherein the tab includes a plurality of bends in-between a bottom end portion of the tab and an other part of the vertical portion, wherein the bottom end portion of the tab is parallel to the other part of the vertical portion.

3. The mounting structure according to claim 2, wherein the tab and the insertion portion are arranged in an interior of a door of the vehicle.

4. The mounting structure according to claim 3, wherein the insertion portion overlaps the vertical portion over a predetermined range.

5. A frame garnish for mounting on a door window frame of a vehicle having a center pillar, wherein the door window frame includes a vertical portion extending in a generally vertical direction so as to overlap the center pillar of the vehicle and having a hooking hole formed in an upper part of the vertical portion and an insertion hole formed in a lower part of the vertical portion, the frame garnish comprising:
    a main portion, which extends along the vertical direction, a hooking portion, which projects from an inner surface of the main portion in a direction oriented orthogonally with respect to the inner surface, and an insertion portion, which projects vertically downward from a bottom part of the inner surface of the main portion, wherein the frame garnish and the vertical portion are configured such that the frame garnish is attachable to the vertical portion by inserting the insertion portion into the insertion hole in the vertically downward direction and inserting and hooking the hooking portion in the hooking hole;
    wherein the vertical portion includes an integrally formed tab defined by leg portions extending along a longitudinal direction from the lower part of the vertical portion, wherein the insertion hole passes through the tab and opposite sides of the insertion hole are defined by the leg portions.

6. The frame garnish according to claim 5, wherein the tab includes a plurality of bends in-between a bottom end portion of the tab and an other part of the vertical portion, wherein the bottom end portion of the tab is parallel to the other part of the vertical portion.

7. The frame garnish according to claim 6, wherein the tab and the insertion portion are arranged in an interior of a door of the vehicle.

8. The frame garnish according to claim 7, wherein the insertion portion overlaps the vertical portion over a predetermined range.

9. A method for mounting the frame garnish of claim 5 on a door window frame of a vehicle having a center pillar, wherein the door window frame includes a vertical portion extending in a generally vertical direction so as to overlap the center pillar, the method comprising:
    forming a hooking hole in an upper part of the vertical portion and an insertion hole in a lower part of the vertical portion;
    forming a frame garnish including a main portion that is generally plate-shaped, has a length extending along the vertical direction and having an inner surface with a hooking portion projecting orthogonally therefrom, and an insertion portion projecting vertically downward from a bottom part of the inner surface of the main portion; and
    attaching the frame garnish to the vertical portion by inserting the insertion portion into the insertion hole in the vertically downward direction and inserting and hooking the hooking portion in the hooking hole.

10. The method according to claim 9, wherein said forming a frame garish includes:
 forming a tab that includes the insertion hole by cutting out opposite sides of the insertion hole from the bottom part of the vertical portion for a predetermined length along a longitudinal direction of the vertical portion; and
 bending the tab to have a crank-shaped cross-section.

11. The method according to claim 10, wherein said forming a frame garnish includes arranging the tab and the insertion portion inside a door of the vehicle.

12. The method according to claim 11, wherein the insertion portion overlaps the vertical portion over a predetermined range.

\* \* \* \* \*